United States Patent [19]

Haisman et al.

[11] Patent Number: 4,810,518
[45] Date of Patent: Mar. 7, 1989

[54] PARTICULATE CREAMER-THICKENER AND PROCESS OF PREPARING THE SAME

[75] Inventors: Derek R. Haisman, Bedford; Gordon D. Woolgar, Worksop, both of United Kingdom

[73] Assignee: Thomas J. Lipton, Inc., Englewood Cliffs, N.J.

[21] Appl. No.: 942,167

[22] Filed: Dec. 16, 1986

[30] Foreign Application Priority Data

Dec. 20, 1985 [GB] United Kingdom ............... 8531391

[51] Int. Cl.$^4$ ............................................. A23L 1/195
[52] U.S. Cl. .................................... 426/578; 426/579; 426/661; 426/613; 426/589; 426/453; 426/608; 426/653
[58] Field of Search ............... 426/578, 579, 589, 608, 426/613, 652, 661, 453, 658

[56] References Cited

U.S. PATENT DOCUMENTS

| | | | |
|---|---|---|---|
| 3,021,222 | 2/1962 | Kerr et al. | 426/578 |
| 3,231,391 | 1/1966 | Breivik et al. | 426/579 |
| 3,331,306 | 7/1967 | Hutton | 426/453 |
| 3,769,027 | 10/1973 | Mangiere et al. | 426/578 |
| 3,949,104 | 4/1976 | Cheng et al. | 426/578 |
| 4,269,863 | 5/1981 | Inagami et al. | 426/578 |
| 4,291,066 | 9/1981 | Anema et al. | 426/578 |
| 4,415,599 | 11/1983 | Bos | 426/579 |
| 4,428,972 | 1/1984 | Wurzburg et al. | 426/661 |

FOREIGN PATENT DOCUMENTS 1398355 6/1975 United Kingdom ............... 426/579

Primary Examiner—Jeanette Hunter
Attorney, Agent, or Firm—Brumbaugh, Graves, Donohue & Raymond

[57] ABSTRACT

A particulate creamer-thickener comprises 5-45%, preferably 10-25% by weight of fat (preferably having a melting point of 30°-45° C., 0.05-5%, preferably 0.1-3% by weight of a proteinaceous emulsifier (e.g. sodium caseinate) or a fatty acid emulsifier, 25-75% by weight of starch thickener and from 0-8% by weight of water. Also a process of its manufacture has been described.

36 Claims, No Drawings

PARTICULATE CREAMER-THICKENER AND PROCESS OF PREPARING THE SAME

The present invention relates to a particulate creamer-thickener for foodstuffs and animal feeds, to a creamer-thickener of certain physico-chemical structure, to a process for the preparation of the creamer-thickener according to the invention and to foodstuffs and animal feeds comprising the creamer-thickener according to the present invention.

BACKGROUND OF THE INVENTION

Creamers and thickeners are important constituents for dry soups, particularly cream-style soups, gravies and sauces and often account for the bulk of the solid ingredients. In cream-style soups the creamers are included at relatively high levels to improve the appearance, texture and to impart a creamy mouthfeel. The creamers used up to now are spray-dried emulsified fat powders, like coffee whiteners, which were developed for incorporation in hot coffee. The requirements set to a coffee whitener are therefore different from those set to a whitener or creamer to be used in soups. The coffee whiteners or creamers are usually manufactured by spray-drying a concentrated emulsion comprising fat, protein, emulsifier, carrier material (usually maltodextrin) and water.

Thickeners are usually native starches, but sometimes also modified starches may be used. The starch material is a difficult material to disperse. The dispersion may be facilitated by fat coating the starch, by agglomerating and fat coating or by mixing with a dispersing aid, like sugar.

It has now been found possible to combine the creamer or whitener and the starch thickener in one product, which can be formulated and manufactured in a way so as to provide a creamer-thickener, which not only performs both functions, i.e. to whiten or cream or to thicken, but which is especially adapted to the environment in which it will be used, e.g. in soups, sauces or gravies, calf milk replacers, puddings or custards or geriatric diets. The creamer-thickener can also be incorporated with advantage into other products, such as cake, pancake and scone mixes, and in low-calorie foods.

The use of such a whitener-thickener or creamer-thickener in e.g. soups and sauces entails several advantages. First of all the combination of a creamer and thickener in one product requires only one drying and agglomeration step in its manufacture instead of two drying and agglomeration steps in the separate manufacture of a creamer/whitener and a thickener, thus leading to savings in production cost. The combination of creamer and thickener in one product further appeared to give optimal creaminess, improved dispersability and better consumer appeal. A third advantage is that on the one hand sometimes certain constituents could be deleted, while in general the amount of other ingredients could be considerably reduced, which again leads to important economic advantages. Also in a mixture of ingredients there is often the risk of segregation of components, which risk does not exist with the creamer-thickener according to the invention.

Finally, in the manufacture of other foodstuffs or animal feeds in which the creamer-thickener is used, there is the advantage of easier handling in the factory, since only one ingredient has to be added instead of two ingredients. An additional advantage is that the creamer-thickener does not exhibit dusting when being handled.

SUMMARY OF THE INVENTION

The present invention therefore relates to a particulate creamer-thickener for foodstuffs and animal feeds, which comprises:
 (a) from 5 to 45% by weight of fat;
 (b) from 0.05 to 5% by weight of emulsifier;
 (c) from 25 to 75% by weight of hydrolyzed starch;
 (d) from 20 to 60% by weight of starch thickener;
 (e) from 0 to 8% by weight of water.

The fat in the creamer-thickener according to the present invention is finely divided to effect whitening when dispersed in the foodstuff or animal feed. Preferably from 10 to 25% by weight of fat is used. The fat may comprise fat fractions, partially or completely hydrogenated oils or fats, interesterified fats and mixtures thereof.

DETAILED DESCRIPTION OF THE INVENTION

It has been found that the wetting properties of the creamer-thickener according to the present invention undergo important changes at the melting point of the fat in the creamer-thickener. The best wetting properties are therefore obtained by the use of a fat having a melting point which is lower than the serving temperature of the food or food product in which the creamer-thickener is used. Therefore the selection of the oil or fat to be used in the creamer-thickener according to the present invention is also dependent according to the present invention is also dependent on the ultimate use of the creamer-thickener. The fat preferably has a melting point of from 30° C. to 45° C. and preferably exhibits the following dilation characteristics: $N_{10}=65-95$; $N_{20}=35-65$; $N_{30}=2-20$; $N_{35}=0-5$. The indication $N_{10}$ means the percentage of solid fat at the indicated temperature in °C. (in this case 10° C.) as determined by means of nuclear magnetic resonance. Such a fat is for example hardened palm oil or palm kernel oil. Antioxidants, flavours and the like may have been added to the fat used. For soups it may be advantageous to use e.g. chicken fat, butter fat or beef fat, which already contributes to the taste of the soup.

The emulsifiers used in the creamer-thickener according to the present invention may be of two types i.e. emulsifying proteinaceous materials and fatty acid derivatives. Also mixtures of the two types may be used. Preferably from 0.1 to 3.0% by weight of emulsifier is used.

The edible emulsifying proteinaceous material may be whole or skimmed milk powder, alkali metal caseinate of which the sodium caseinate is preferred, ammonium caseinate, oilseed protein concentrate, like soybean protein concentrate, oilseed protein isolate, like soybean isolates or enzyme modified soybean isolates, single cell protein, fungal protein, succinylated proteins like succinylated whey protein, whey protein or whey solids, or mixtures thereof. It is also possible to use whole or skimmed milk as a liquid in in the manufacture of the creamer-thickener before drying the final composition.

The emulsifier may also be a fatty acid derivative, such as the diacetyl tartaric acid esters of mono- and mono-diglycerides of $C_{12}$–$C_{24}$ fatty acids and the sodium or potassium salts thereof (like Admul DATA esters, Trade Mark, ex PPF International); the $C_{12}-C_{24}$ fatty acid derived n-lactylic acids, where n ranges on the average from about 1 to 5 and the sodium, potassium and calcium salts thereof (like Admul SSL, Trade Mark, ex PPF International); the propylene glycol esters of $C_{12}-C_{24}$ fatty acids; the glycerol mono- and mono-diesters of $C_{12}-C_{24}$ fatty acids or ethoxylated derivatives thereof and their mixtures with alkali metal soaps of $C_{12}-C_{24}$ fatty acids; sorbitan esters of polyoxyethylenesorbitan esters of $C_{12}-C_{24}$ fatty acids; esters of succini acid, lactic acid or citric acid with mono- and mono-diglycerides or propylene glycol partial esters of $C_{12}-C_{24}$ fatty acids and the sodium or potassium salts thereof; lecithin; hydroxylated and/or at least partially hydrolysed lecithin; sodium stearyl fumarate; the polyglycerol esters of $C_{12}-C_{24}$ fatty acids (or polymers or condensates of these fatty acids) having from 3 to 10 glycerol units and from 1 to 10 fatty acids per molecule, the sucrose esters of $C_{12}-C_{24}$ fatty acids or of mono- and mono-diglycerides, or mixtures of one or more of any of these fatty acid derivatives. In the fatty acid derivative emulsifier the fatty acids can be saturated and/or unsaturated fatty acids. In some instances the unsaturated fatty acids may be preferred.

Some of the fatty acid derivative emulsifiers, such as e.g. the polyglycerol esters, the sucrose esters and the glycerol mono- and mono-diesters will only be effective when used conjointly with the edible emulsifying proteinaceous material.

In general mixtures of the edible emulsifying proteinaceous material and the fatty acid derivative may be used. In view of the tendency to use as many natural or natural-identical additives as possible, it is, under the circumstancs, possible to use only the edible emulsifying proteinaceous material as the emulsifier, which is an additional advantage of the creamer-thickener according to the present invention.

The hydrolyzed starches serve to form a matrix for the fat component and the starch thickener, and the term "hydrolyzed starches" encompasses glucose syrup solids, corn syrup solids and maltodextrins. They are characterized by their dextrose equivalent (D.E.). The dextrose equivalent is the total amount of reducing sugars present in per cent of total dry substance, expressed as dextrose. In general from 25% to 75% by weight and preferably from 30 to 50% by weight of hydrolysed starch is used.

The selection of the type of hydrolyzed starch in the present invention is mainly made on the basis of two criteria, viz. the taste and the speed of dissolution. With regard to the taste one may distinguish between sweet and non-sweet products. Generally the products with a higher D.E. have a sweeter taste, and these are therefore preferred for use in the creamer-thickener according to the present invention if it has to be used in more sweet foodstuffs like custards and puddings. The D.E. of the hydrolyzed starches in the creamer-thickener according to the present invention to be used in sweet products can be up to 50.

The second criterion is the speed of dissolution and it can be stated that the maltodextrins with a low D.E., i.e. at most 30, are only slowly dissolving, whereas e.g. glucose is rapidly dissolving.

For instantly dispersing soups, sauces and gravies and also calf milk replacer, penetration of the liquid into the interstices of the agglomerates or powder is almost instantaneous. On the other hand, if lumping is to be avoided, once the powder is wetted, further hydration and swelling must be held in check until the individual particles are separated one from the other in the bulk of the liquid by stirring or other agitation. The hydration at this stage depends on the nature of the matrix material in which the starch and fat particles are embedded. If, for instance, this contains a low DE maltodextrin, which dissolves only slowly, it will take longer to hydrate than if the matrix material is mainly dextrose. Thus, by varying the composition of the matrix, the hydration of the fat and starch thickener particles, which are enclosed or embedded in the hydrolyzed starch material matrix, can be completely controlled to meet product requirements.

In the sweet products the hydrolyzed starch can also at least partially be replaced by dextrose, lactose or normal cane sugar and the expression hydrolyzed starch for the purpose of the present invention also encompasses dextrose, lactose and cane sugar.

The starch thickener which is used in the cramer-thickener according to the present invention may be corn starch, potato starch, wheat starch, rye starch, tapioca starch, rice starch, oats starch or mixtures thereof. Also physically or chemically modififed starches like acetylated adipate and hydroxypropyl distarch phosphate and starch modified with octenyl succinic anhydride may be used. The use of pre-gelatinized starches may entail special precautionary measure in the manufacture of the creamer-thickener according to the present invention owing to their swelling characteristics. The preferred amount of the starch thickener is from 30 to 50% by weight.

In a preferred embodiment of the present invention the creamer thickener also serves as a carrier material for flavouring or aromatizing materials. The creamer-thickener therefore may comprise up to 20% by weight of a flavouring or aromatizing material, particularly tomato material, cream flavour, butter flavour, meat flavour, or precursors of these aromatizing or flavouring materials, which either during the manufacture of the creamer-thickener form the flavouring material or which in contact with the product in which the creamer-thickener is used do give rise to the development of the flavouring material. Also vegetable material may be used as flavouring material.

In another embodiment of the present invention the creamer-thickener also comprises an edible sequestering agent in an amount of up to 5% by weight. It has been found useful to incorporate such a sequestering agent in view of the different degrees of hardness of the water in which the creamer-thickener is dispersed. Suitable edible sequestering agents are alkali metal tripolyphosphate, alkali metal orthophosphate, alkali metal citrate, or mixtures thereof.

The creamer-thickener also comprises up to 8% by weight of moisture and may comprise up to 5% by weight of functional additives, such as colouring agents, anti-caking agents (like sodium silico-aluminate), preservatives, antioxidants, vitamins, minerals, sweeteners, anti-foaming agents, buffers, but also minor amounts of pigments or other additives, or mixtures of any one or more of these additives.

The creamer-thickener may also comprise 5% by weight of common salt.

The particulate creamer-thickener according to the present invention has a special physico-chemical structure. The starch thickener granules and the fat particles are embedded in a matrix of the hydrolyzed starch, which hydrolyzed starch owing to its dissolution and wetting characteristics has controlled hydrating properties.

The fat droplets or particles obtained after hydration of the creamer-thickener have an average droplet diameter of from 0.2 to 0.5 μm. Preferably the fat particles in the creamer-thickener are surrounded by a layer of the edible emulsifying proteinaceous material. In a preferred embodiment of the present invention the creamer-thickener consists of agglomerates of primary particles of creamer-thickener material having an average particle size of from 10 to 100 μm. The agglomerates have an average particle size of from 100 to 1000 μm, preferably from 350 to 700 μm.

The agglomerates of creamer-thickener according to the present invention preferably have a particle density of from 1200 to 1500 kg/m$^3$ and a compacted bulk density from 300 to 700 kg/m$^3$.

The particulate creamer-thickener according to the present invention can be used in foodstuffs such as dry soups, particularly cream-style soups, sauces, gravies, custards, and puddings, geriatric diets and in animal feeds such as calf milk replacer. The creamer-thickener can also be incorporated with advantage into other products, such as cake, pancake and scone mixes, and in dressings.

The present invention also relates to a process for the preparation of the particulate creamer-thickener of the present invention. In this process the water-soluble constituents of the creamer-thickener with the exception of the starch thickener are dissolved in the least possible amount of water and this solution is emulsified with the fat. The emulsion obtained is homogenized, e.g. in a two-stage homogenization at pressures of 250 bar and 50 bar, respectively. This homogenized emulsion is then cooled, if necessary, to a temperature below the gelatinization temperature of the starch thickener, before the emulsion is combined with the starch thickener. The mixture of the homogenized emulsion and the starch thickener is prepared in such a way that the mixture has a solids content of from 45 to 60% by weight, after which the mixture is dried and agglomerated. Preferably the mixture is spray-dried during which the drying and the agglomerated take place in the same treatment.

The invention is now illustrated by the following Examples which are not to be construed as limiting the scope of the present invention.

EXAMPLE I

A mixture of the following composition :

| | |
|---|---|
| Corn starch | 26.0% |
| Hardened palm oil (melting point 40-43° C.) | 10.0% |
| Sodium caseinate | 0.7% |
| Sodium tripolyphosphate | 0.3% |
| Maltodextrin (D.E. = 20) | 19.0% |
| Water | 44.0% |
| | 100.0% by weight | was prepared as follows to be spray-dried: The fat was heated in a steam kettle until it had been molten and had reached a temperature of 70° C. Then the sodium caseinate was stirred into the fat. The maltodextrin and the sodium tripolyphosphate were dissolved in the water at 70° C., and then the fat phase was mixed with the aqueous phase while vigorously stirring and the mixtured obtained was homogenized in a two-stage piston homogenizer at a pressure in the first stage of 250 bar and in the second stage of 50 bar. The emulsion obtained was cooled to 40° C. and the corn starch mixed in with constant stirring. The suspension obtained (solids content 56% by weight) was then spray-dried in a spray-drier with an integral fluidization bed, at an air inlet temperature of 245° C. and an air outlet temperature of 92° C. The product was a coarse white agglomerate having the following composition and physical characteristics:

| | |
|---|---|
| Fat | 17.1% |
| Caseinate | 1.03% |
| Sodium tripolyphosphate | 0.51% |
| Corn starch | 44.6% |
| Maltodextrin | 32.56% |
| Moisture | 4.2% |
| | 100.0% by weight |

Mean diameter of agglomerate particles 375 μm; bulk density of agglomerate 500 kg/m$^3$; particle density 1315 kg/m$^3$; mean oil droplet diameter after reconstitution 0.43 μm.

Of this creamer-thickener 13.0 g were blended with 7.0 g of chicken and vegetable pieces, spices, flavours and this mixture was then reconstituted with 190 ml of boiling water. The powdery mixture dispersed instantly, with no tendency to form lumps and formed a rich, creamy soup with excellent flavour, appearance and taste.

EXAMPLE II

Example I was repeated, but now starting from the following composition:

| | |
|---|---|
| Corn starch | 16% |
| Hardened palm oil (as in Example I) | 12.0% |
| Sodium caseinate | 0.7% |
| Sodium tripolyphosphate | 0.3% |
| Maltodextrin (D.E. = 20) | 20.0% |
| Water | 51.0% |
| | 100.0% by weight |

This composition was spray-dried in the same way as described in Example I, starting from a suspension with a solids content of 49% by weight, yielding a coarse white agglomerate having the following composition and physical characteristics:

| | |
|---|---|
| Corn starch | 31.0% |
| Fat | 23.0% |
| Caseinate | 1.4% |
| Sodium tripolyphosphate | 0.69% |
| Maltodextrin | 38.91% |
| Water | 5.0% |
| | 100.0% by weight |

Mean diameter of agglomerate particles 350 μm; bulk density of agglomerate 515 kg/m$^3$; particle density 1250 kg/m$^3$; mean oil droplet diameter after reconstitution 0.33 μm. Of this creamer-thickener 18.5 g was blended with 7.5 g of mushroom pieces, spices and flavouring substances, and this mixture was then reconstituted with 190 ml of boiling water. The powder dispersed instantly, with no tendency to form lumps, to form a rich, creamy mushroom soup with excellent appearance and taste.

EXAMPLE III

A mixture of the following composition:

| | |
|---|---|
| Potato starch | 27.6% |
| Hardened palm oil containing 100 ppm BHA and 100 ppm BHT and having a melting point of 40–43° C. | 10.3% |
| Sodium caseinate | 0.6% |
| Sodium orthophosphate | 0.3% |
| Maltodextrin (D.E. = 19-23) | 16.4% |
| Water | 44.8% |
| | 100.0% by weight | was prepared as follows to be spray-dried: The fat was heated in a steam kettle till it had been molten and had reached a temperature of 70° C. Then the sodium caseinate was stirred into the fat. The maltodextrin and the sodium orthophosphate were dissolved in the water at 70° C. and then the fat phase was mixed with the aqueous phase while vigorously stirring and the mixture obtained was homogenized in a two-stage piston homogenizer at a pressure in the first stage of 250 bar and in the second stage of 50 bar. The emulsion obtained was cooled to 30° C. and the potato starch mixed in with constant sitrring. The suspension obtained (solids content 55.2% by weight) was then spray-dried in a spray-drier with an integral fluidized bed, at an air inlet temperature of 250° C. and an air outlet temperatur of 98° C. The product was a white agglomeratee having the flowing composition and physical characteristics:

| | |
|---|---|
| Fat | 17.5% |
| Potato starch | 47.1% |
| Caseinate | 1.0% |
| Sodium orthophosphate | 0.5% |
| Maltodextrin | 28.0% |
| Water | 5.9% |
| | 100.0% |

Mean diameter of agglomerate particles 620 μm; bulk density of agglomerate 505 kg/m³; mean fat droplet diameter after reconstitution 0.34 μm.

10 g of this creamer-thickener was mixed with 6.5 g of asparagus powder, croutons, flavouring substances and spices and this mixture was then reconstituted by addition of 190 ml of boiling water. A rich creamy asparagus soup was obtained with no tendency of lump formation upon reconstitution of the powder.

EXAMPLE IV

Example III was repeated but now using the following composition as the starting mixture:

| | |
|---|---|
| Palm oil (melting point 37–39° C.) | 10.3% |
| Admul DATA 1952[1] | 0.3% |
| Sodium caseinate | 0.6% |
| Sodium tripolyphosphate | 0.3% |
| Maltodextrin (D.E. = 11–14) | 16.4% |
| Corn starch | 24.8% |
| Water | 47.3% |
| | 100.0% by weight |

[1]The reaction product of partial glycerides of edible oils and fats with diacetyl tartaric anhydride having an acid value of 60–85; a saponification value of 380–420 and an iodine value of max. 2; ex PPF International (Trade Mark)

After spray-drying the composition in the same way as in Example III, starting with a suspension having a solids content of 52.7% by weight, a coarse white agglomerate was obtained, having the following composition and physical characteristics:

| | |
|---|---|
| Fat | 19.1% |
| Corn starch | 45.1% |
| Caseinate | 1.15% |
| Sodium tripolyphosphate | 0.55% |
| Maltodextrin | 29.35% |
| Emulsifier | 0.55% |
| Water | 4.2% |
| | 100.0% by weight |

Mean diameter of agglomerate particles 455 μm; bulk density of agglomerate 500 kg/m³; particle density 1250 kg/m³; mean oil droplet diameter after reconstitution 0.30 μm. 37 g of this creamer-thickener were blended with 25 g of chicken meat pieces, flavouring substances and spices. The powder was stirred into 1 pint of boiling water in which it dispersed quickly and evenly, without any lump formation, to make a smooth creamy chicken soup of excellent taste.

We claim:

1. A particulate creamer-thickener for foodstuffs and animal feeds comprising:
   (a) from 5 to 45% by weight of fat;
   (b) from 0.05 to 5% by weight of emulsifier;
   (c) from 25 to 75% by weight of hydrolyzed starch;
   (d) from 20 to 60% by weight of starch thickener; and
   (e) from 0 to 8% by weight of water, wherein the starch thickener and emulsified fat are embedded within a matrix of the hydrolyzed starch having controlled hydrating properties, said creamer-thickener consisting of agglomerates of primary particles of creamer-thickener having an average particle size of from 10–100 μm, said agglomerates having an average particle size of 100–1000 μm.

2. The particulate creamer-thickener according to claim 1, in which the amount of fat is from 10 to 25% by weight of the creamer-thickener.

3. The particulate creamer-thickener according to claim 1, in which the fat has a melting point of from 30° C. to 45° C. and has the following dilation characteristics: $N_{10}=65-95$; $N_{20}=35-65$; $N_{30}=2-30$; $N_{35}=0-5$.

4. The particulate creamer-thickener according to claim 1, in which the fat is selected from the group consisting of chicken fat, butter fat and beef fat.

5. The particulate creamer-thickener according to claim 1, in which the emulsifier is selected from the group consisting of edible emulsifying proteinaceous materials, fatty acid derivatives, and mixtures thereof.

6. The particulate creamer-thickener according to claim 5, in which the edible emulsifying proteinaceous material is selected from the group consisting of whole milk powder, skimmed milk powder, alkali metal caseinate, ammonium caseinate, oilseed protein concentrate, oilseed protein isolate, single cell protein, fungal protein, whey protein or whey solids, succinylated proteins, and mixtures thereof.

7. The particulate creamer-thickener according to claim 5, in which the fatty acid derivative is selected from the group consisting of diacetyl tartaric acid esters of mono- and mono-diglycerides of $C_{12}$–$C_{24}$ fatty acids and the sodium and potassium salts thereof, $C_{12}$–$C_{24}$ fatty acid derived-n-lactylic acids, where n ranges on the average from about 1 to 5 and the sodium, potassium and calcium salts thereof, propylene glycol esters of $C_{12}$–$C_{24}$ fatty acids; the glycerol mono- and mono-diesters of $C_{12}$–$C_{24}$ fatty acids or ethoxylated derivatives thereof and their mixtures with alkali metal soaps of $C_{12}$–$C_{24}$ fatty acids; sorbitan esters or polyoxyethylene sorbitan esters of $C_{12}$–$C_{24}$ fatty acids; esters of succinic acid, lactic acid or citric acid with mono- and mono-diglycerides of $C_{12}$–$C_{24}$ fatty acids or propylene glycol partial esters of $C_{12}$–$C_{24}$ fatty acids and the sodium and potassium salts thereof; lecithins, hydroxylated and/or at least partially hydrolysed lecithin, sodium stearyl fumarate, polyglycerol esters of $C_{12}$–$C_{24}$ fatty acids, or polymers or condensates of these fatty acids, having from 3 to 10 glycerol units and from 1 to 10 fatty acids per molecule, sucrose esters of $C_{12}$–$C_{24}$ fatty acids or mono- and mono-diglycerides, and mixtures thereof, with the proviso that the polyglycerol esters, the sucrose esters and the glycerol mono- and mono- diesters are used conjointly with the edible emulsifying proteinaceous material.

8. The particulate creamer-thickener according to claim 1, in which the amount of emulsifier is from 0.1 to 3.0% by weight of the creamer-thickener.

9. The particulate creamer-thickener according to claim 1, in which the hydrolyzed starch has a dextrose equivalent (D.E.) of at most 50.

10. The particulate creamer-thickener according to claim 1, in which the hydrolyzed starch has a dextrose equivalent (D.E.) of at most 30.

11. The particulate creamer-thickener according to claim 1, in which the amount of hydrolyzed starch is from 30 to 50% by weight of the creamer-thickener.

12. The particulate creamer-thickener according to claim 1, in which the starch thickener is selected from the group consisting of the starches of corn, rice, oats, wheat, rye, tapioca, or mixtures thereof, physically or chemically modified starches, and mixtures of starches and chemically modified starches.

13. The particulate creamer-thickener according to claim 1, in which the amount of starch thickener is from 30 to 50% by weight of the creamer-thickener.

14. The particulate creamer-thickener according to claim 1, comprising up to 20% by weight of a flavouring agent.

15. The particulate creamer-thickener according to claim 14, in which the flavouring agent is selected from the group consisting of tomato material, cream flavour, butter flavour, meat flavour, and mixtures or precursor mixtures thereof.

16. The particulate creamer-thickener according to claim 1, comprising up to 5% by weight of an edible sequestering agent.

17. The particulate creamer-thickener according to claim 16, in which the edible sequestering agent is selected from the group consisting of alkali metal tripolyphosphate, alkali metal orthophosphate, alkali metal citrate, and mixtures thereof.

18. The particulate creamer-thickener according to claim 1, comprising up to 5% by weight of a functional additive, selected from the group consisting of colouring agents, anti-caking agents, preservatives, antioxidants, vitamins, minerals, sweeteners, anti-foaming agents, buffers, and mixtures thereof.

19. The creamer-thickener according to claim 1, in which the fat particles are enclosed by an emulsifying proteinaceous material.

20. The creamer-thickener according to claim 19, in which the fat particles have an average particle size of from 0.2 to 0.5 $\mu$m upon hydration.

21. The creamer-thickener according to claim 1, in which the agglomerates have an average particle size of from 350 to 700 $\mu$m.

22. The creamer-thickener according to claim 1, in which the agglomerates have a particle density of from 1200 to 1500 kg/m$^3$.

23. The creamer-thickener according to claim 1, in which the agglomerates have a compacted bulk density of from 300 to 700 kg/m$^3$.

24. Soups comprising the creamer-thickener according to claim 1.

25. Puddings comprising the creamer-thickener according to claim 1.

26. Calf milk replacer comprising the creamer thickener according to claim 1.

27. A process for the preparation of a creamer-thickener for foodstuffs and animal feeds comprising from 5 to 45% by weight of fat, from 0.05 to 5% by weight of emulsifier, from 25 to 75% by weight of hydrolyzed starch, from 20 to 60% by weight of starch thickener, and from 0 to 8% by weight of water, comprising the steps of emulsifying the water-soluble constituents of the creamer-thickener, except the starch thickener, with the fat, homogenizing the emulsion, mixing the homogenized emulsion with the starch thickener, drying the mixture, and agglomerating the mixture, whereby the hydrolyzed starch forms a matrix having controlled hydrating properties and having embedded therein particles of starch thickener and emulsified fat.

28. The process according to claim 22, in which the edible emulsifying proteinaceous material is whole or skimmed milk.

29. The process according to claim 22, in which the homogenized emulsion is cooled to a temperature below the gelatinization temperature of the starch thickener before the emulsion is mixed with the starch thickener.

30. The process according to claim 22, in which the drying and the agglomeration are carried out by means of a spray-drying treatment.

31. The process according to claim 22, in which the mixture of the homogenized emulsion and the starch thickener has a solids content of from 45 to 60% by weight.

32. Sauces comprising the creamer-thickener according to claim 1.

33. Gravies comprising the creamer-thickener according to claim 1.

34. Custards comprising the creamer-thickener according to claim 1.

35. Low- calorie food comprising the creamer-thickener according to claim 1.

36. Geriatric diet comprising the creamer-thickener of claim 1.

* * * * *

UNITED STATES PATENT AND TRADEMARK OFFICE
CERTIFICATE OF CORRECTION

PATENT NO. : 4,810,518
DATED : March 7, 1989
INVENTOR(S) : Haisman et al.

It is certified that error appears in the above-identified patent and that said Letters Patent is hereby corrected as shown below:

Col. 2, lines 33-34, delete "according to the present invention is also dependent";

Col. 3, line 33, "natural-identical" should read --nature-identical--;

Col. 3, line 34, "circumstancs" should read --circumstances--;

Col. 4, line 19, "cramer-" should read --creamer- --;

Col. 4, line 23, "modifified" should read --modified--;

Col. 4, line 27, "measure" should read --measures--;

Col. 5, line 42, "agglomerated" should read --agglomeration--;

UNITED STATES PATENT AND TRADEMARK OFFICE
CERTIFICATE OF CORRECTION

PATENT NO. : 4,810,518
DATED : March 7, 1989
INVENTOR(S) : Haisman et al.

It is certified that error appears in the above-identified patent and that said Letters Patent is hereby corrected as shown below:

Col. 5, line 66, "mixtured" should read --mixture--;

Col. 6, line 5, "fluidization" should read --fluidized--;

Col. 7, line 30, "agglomeratee" should read --agglomerate--; and

Col. 10, Claims 28, 29, 30 and 31, line 1 of each, "claim 22" should read --claim 27--.

Signed and Sealed this

Thirty-first Day of October, 1989

Attest:

DONALD J. QUIGG

Attesting Officer

Commissioner of Patents and Trademarks